(12) United States Patent
Fischer et al.

(10) Patent No.: US 8,632,095 B2
(45) Date of Patent: Jan. 21, 2014

(54) AIR BAG WITH ADAPTIVE TETHER

(75) Inventors: Kurt F. Fischer, Leonard, MI (US); Douglas M. Gould, Lake Orion, MI (US)

(73) Assignee: TRW Vehicle Safety Systems Inc., Washington, MI (US)

( * ) Notice: Subject to any disclaimer, the term of this patent is extended or adjusted under 35 U.S.C. 154(b) by 73 days.

(21) Appl. No.: 13/093,006

(22) Filed: Apr. 25, 2011

(65) Prior Publication Data

US 2011/0198828 A1 Aug. 18, 2011

Related U.S. Application Data

(63) Continuation-in-part of application No. 12/703,325, filed on Feb. 10, 2010, now abandoned, and a continuation-in-part of application No. 12/077,826, filed on Mar. 21, 2008, which is a continuation-in-part of application No. 11/881,918, filed on Jul. 30, 2007, now Pat. No. 7,954,850.

(60) Provisional application No. 61/207,383, filed on Feb. 11, 2009, provisional application No. 60/936,710, filed on Jun. 21, 2007.

(51) Int. Cl.
*B60R 21/2338* (2011.01)

(52) U.S. Cl.
USPC ............................... 280/743.2; 280/739

(58) Field of Classification Search
CPC ............ B60R 21/2338; B60R 21/2342; B60R 21/239
USPC ................... 280/743.2, 730.1, 739
See application file for complete search history.

(56) References Cited

U.S. PATENT DOCUMENTS

| 5,308,113 | A | 5/1994 | Moriset |
| 5,489,119 | A | 2/1996 | Prescaro et al. |
| 5,613,708 | A | 3/1997 | Bleider et al. |
| 5,678,858 | A | 10/1997 | Nakayama et al. |
| 5,813,696 | A | 9/1998 | Hill |
| 5,887,894 | A | 3/1999 | Castagner et al. |
| 5,997,037 | A | 12/1999 | Hill et al. |
| 6,390,501 | B1 | 5/2002 | Greib et al. |
| 6,454,300 | B1 | 9/2002 | Dunkle et al. |

(Continued)

FOREIGN PATENT DOCUMENTS

WO 2008063103 5/2008

*Primary Examiner* — Karen Beck
(74) *Attorney, Agent, or Firm* — Tarolli, Sundheim, Covell & Tummino LLP

(57) ABSTRACT

An apparatus (10) for helping to protect an occupant (20) of a vehicle (12) includes an inflatable vehicle occupant protection device (14) having a deflated condition and an inflated condition. An anchor tether (102) is secured to the vehicle (12). A shaping tether (104) is secured to a first portion (116) of the protection device (14). A releasable connection (132) connects the anchor tether (102) and shaping tether (104). The shaping tether (104) secured to the vehicle (12) via the connection (132) with the anchor tether (102) restricting deployment of the first portion (116) of the protection device (14). The connection (132) is configured to withstand tension between the anchor tether (102) and shaping tether (104) when the protection device (14) is fully pressurized. A trigger tether (106) is secured to a second portion (122) of the protection device (14) and is configured to release the connection (132) between the anchor tether (102) and shaping tether (104) when tension in the trigger tether reaches a predetermined level.

23 Claims, 13 Drawing Sheets

(56) References Cited

U.S. PATENT DOCUMENTS

| | | |
|---|---|---|
| 6,502,858 B2 | 1/2003 | Amamori |
| 6,511,094 B2 | 1/2003 | Thomas et al. |
| 6,561,545 B2 | 5/2003 | Greib et al. |
| 6,616,184 B2 | 9/2003 | Fischer |
| 6,932,384 B2 | 8/2005 | Waid et al. |
| 6,932,385 B2 * | 8/2005 | Hawthorn et al. ............ 280/739 |
| 7,093,854 B2 | 8/2006 | Fischer et al. |
| 7,134,691 B2 * | 11/2006 | Dunkle et al. ............. 280/743.2 |
| 7,195,281 B2 | 3/2007 | Williams et al. |
| 7,249,783 B2 | 7/2007 | Parkinson et al. |
| 7,261,320 B2 | 8/2007 | Fredin et al. |
| 7,275,763 B2 | 10/2007 | Thomas et al. |
| 7,374,205 B2 | 5/2008 | Thomas |
| 7,556,290 B2 | 7/2009 | Williams et al. |
| 7,722,080 B2 | 5/2010 | Rose et al. |
| 7,793,978 B2 | 9/2010 | Vigeant et al. |
| 2004/0017069 A1 | 1/2004 | Fischer |
| 2005/0098990 A1 | 5/2005 | Pinsenschaum et al. |
| 2008/0073891 A1 | 3/2008 | Rose et al. |
| 2008/0073892 A1 | 3/2008 | Rose et al. |
| 2008/0073893 A1 | 3/2008 | Schneider |
| 2008/0315567 A1 | 12/2008 | Fischer et al. |
| 2009/0020991 A1 | 1/2009 | Abe et al. |
| 2009/0033081 A1 | 2/2009 | Fischer et al. |
| 2011/0031723 A1 * | 2/2011 | Fischer et al. ............. 280/730.1 |
| 2012/0104734 A1 * | 5/2012 | Fischer et al. ............. 280/730.1 |

* cited by examiner

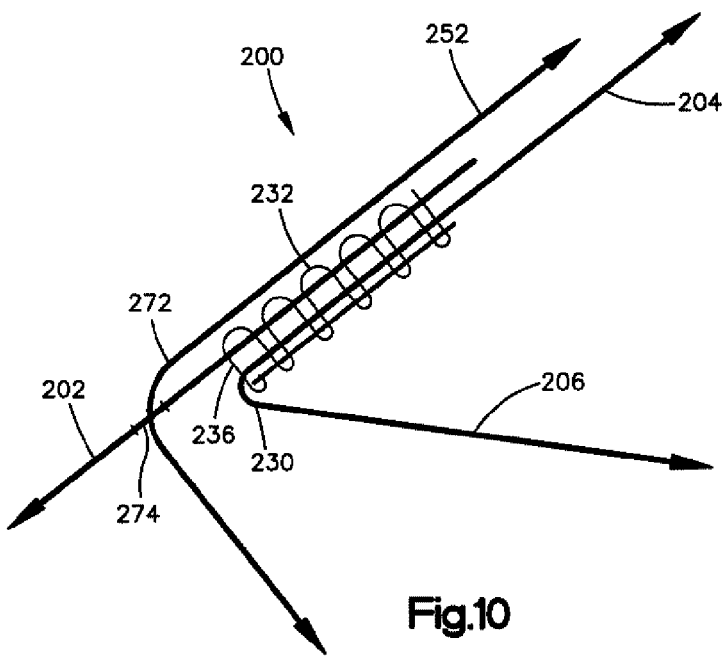
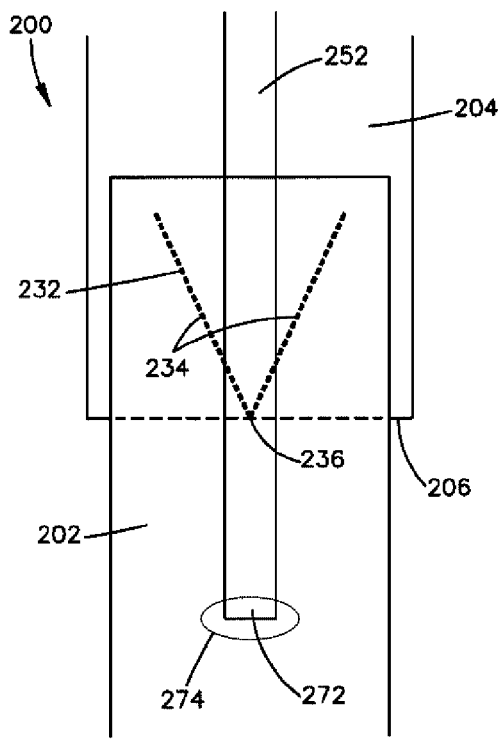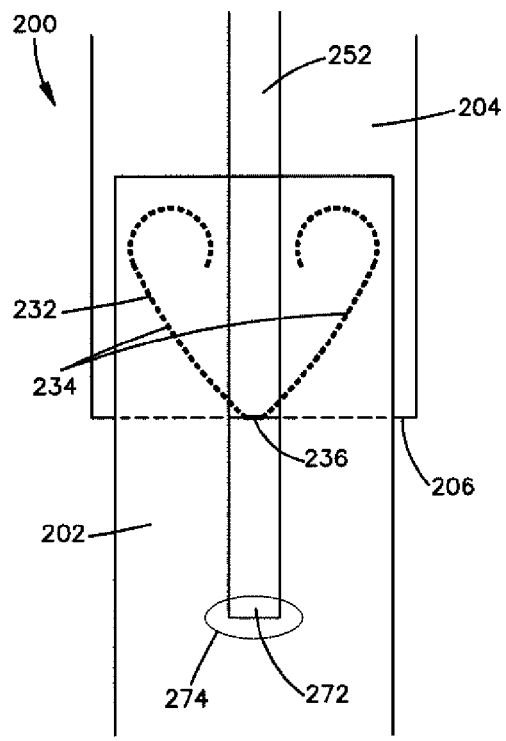

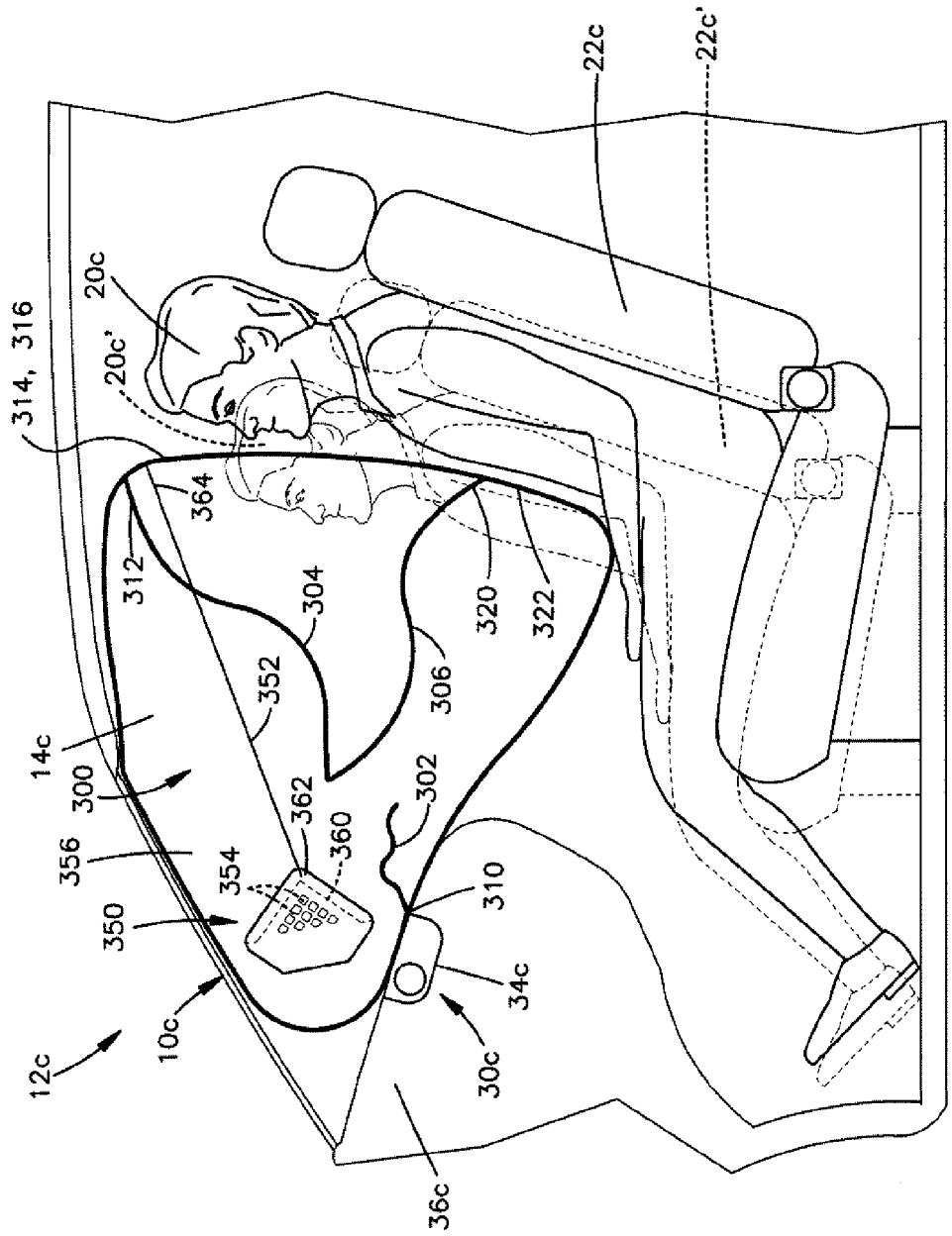

US 8,632,095 B2

AIR BAG WITH ADAPTIVE TETHER

RELATED APPLICATIONS

This application is a continuation in part of U.S. patent application Ser. No. 12/703,325 filed Feb. 10, 2010 now abandoned, which claims the benefit of U.S. Provisional Application Ser. No. 61/207,383 filed on Feb. 11, 2009. This application is also a continuation in part of U.S. patent application Ser. No. 12/077,826 filed on Mar. 21, 2008, which is a continuation in part of U.S. patent application Ser. No. 11/881,918 filed on Jul. 30, 2007 now U.S. Pat. No. 7,954,850, which is based on U.S. Provisional Application Ser. No. 60/936,710 filed on Jun. 21, 2007, all of which are hereby incorporated by reference.

FIELD OF THE INVENTION

The present invention relates to an apparatus for helping to protect an occupant of a vehicle. More particularly, the present invention relates to an air bag inflatable between an instrument panel and a front seat occupant of a vehicle.

BACKGROUND OF THE INVENTION

It is known to provide an inflatable vehicle occupant protection device, such as an air bag, for helping to protect an occupant of a vehicle. One particular type of air bag is a frontal air bag inflatable between an occupant of a front seat of the vehicle and an instrument panel of the vehicle. Such air bags may be driver air bags or passenger air bags. When inflated, the driver and passenger air bags help protect the occupant from impacts with parts of the vehicle such as the instrument panel and/or a steering wheel of the vehicle.

Passenger air bags are typically stored in a deflated condition in a housing that is mounted to the vehicle instrument panel. An air bag door is connectable with the housing and/or instrument panel to help enclose and conceal the air bag in a stored condition. Upon deployment of the passenger air bag, the air bag door opens to permit the air bag to move to an inflated position. The air bag door opens as a result of forces exerted on the door by the inflating air bag.

Driver air bags are typically stored in a deflated condition in a housing that is mounted on the vehicle steering wheel. An air bag cover is connectable with the housing and/or steering wheel to help enclose and conceal the air bag in a stored condition. Upon deployment of the driver air bag, the air bag cover opens to permit the air bag to move to an inflated position. The air bag cover opens as a result of forces exerted on the cover by the inflating driver air bag.

SUMMARY OF THE INVENTION

The present invention relates to an apparatus for helping to protect an occupant of a vehicle includes an inflatable vehicle occupant protection device having a deflated condition and an inflated condition. An anchor tether is secured to the vehicle. A shaping tether is secured to a first portion of the protection device. A releasable connection connects the anchor tether and shaping tether. The shaping tether secured to the vehicle via the connection with the anchor tether restricting deployment of the first portion of the protection device. The connection is configured to withstand tension between the anchor tether and shaping tether when the protection device is fully pressurized. A trigger tether is secured to a second portion of the protection device and is configured to release the connection between the anchor tether and shaping tether when tension in the trigger tether reaches a predetermined level.

BRIEF DESCRIPTION OF THE DRAWINGS

The foregoing and other features of the present invention will become apparent to one skilled in the art to which the present invention relates upon consideration of the following description of the invention with reference to the accompanying drawings, in which:

FIGS. 10, 11A and 11B are schematic illustrations of a portion of the apparatus of FIGS. 8 and 9;

FIGS. 12 and 13 are schematic side views illustrating a fourth embodiment of an apparatus for helping to protect an occupant of a vehicle, illustrating the apparatus in different conditions, according to the present invention;

FIGS. 14, 15A and 15B are schematic illustrations of a portion of the apparatus of FIGS. 12 and 13.

DETAILED DESCRIPTION OF THE INVENTION

Figure 1:
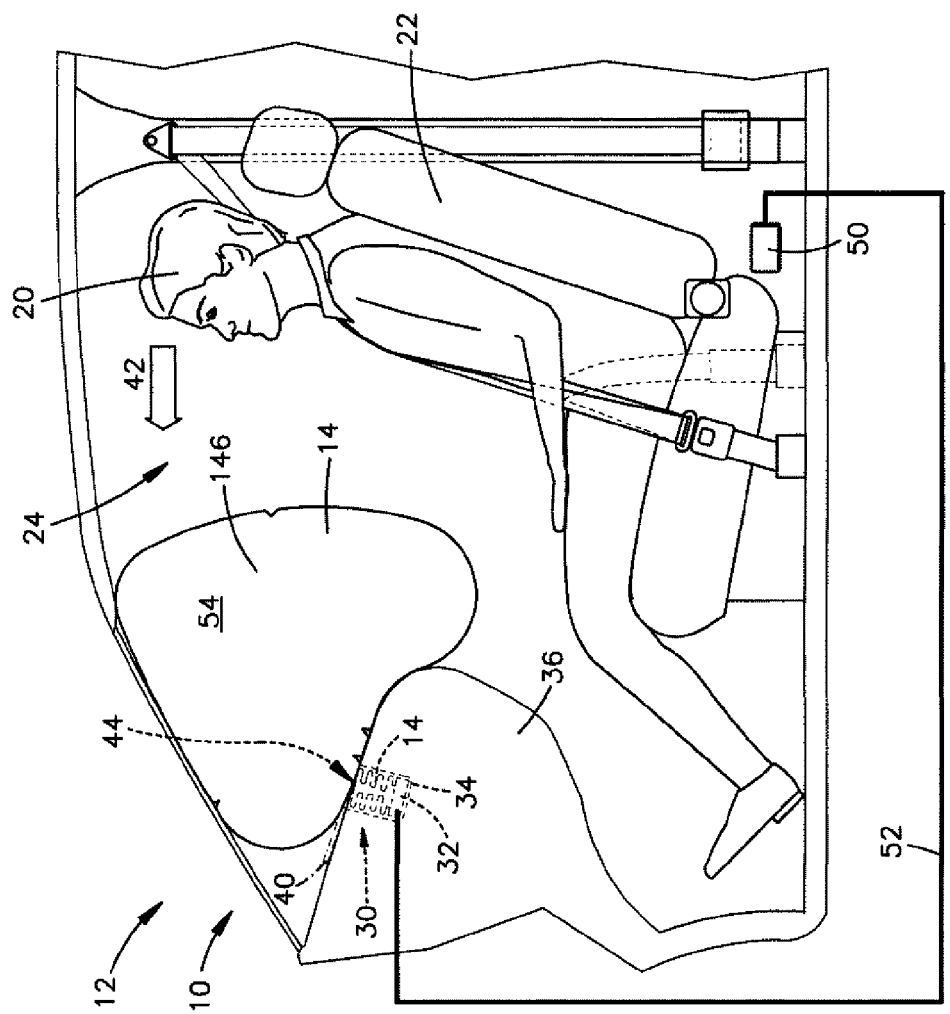
FIG. 1 is a schematic side view illustrating an apparatus for helping to protect an occupant of a vehicle.

An apparatus 10 for helping to protect an occupant 20 of a vehicle 12 includes an inflatable vehicle occupant protection device 14 in the form of an air bag. In the embodiment illustrated in FIG. 1, the air bag 14 is a passenger frontal air bag for helping to protect an occupant 20 of a seat 22 on a passenger side 24 of the vehicle 12.

The air bag 14 may be part of an air bag module 30 that includes an inflator 32 and a housing 34. The air bag 14 has a stored condition, indicated by dashed lines in FIG. 1, in which the air bag is folded and placed in the housing 34. The module 30 is mounted to a dash or instrument panel 36 of the vehicle 12. The housing 34 helps contain and support the air bag 14 and inflator 32 in the instrument panel 36.

An air bag door 40 is releasably connected to the instrument panel 36 and/or the housing 34. In a closed condition (not shown), the air bag door 40 forms a cover for the module 30 and helps enclose the air bag 14 in the stored condition in the housing 34. The door 40 is movable to an opened condition illustrated in FIG. 1 to uncover an opening 44 through which the air bag 14 may be deployed from the stored condition in the housing 34. The door 40 may be connected to the vehicle 12, e.g., the instrument panel 36, either directly or through the housing 34, by means (not shown), such as a plastic hinge portion, a strap, or a tether.

The inflator 32 is actuatable to provide inflation fluid to an inflatable volume 54 of the air bag 14 to deploy the air bag to the inflated condition. The inflator 32 may be of any known type, such as stored gas, solid propellant, augmented, or hybrid. The apparatus 10 includes a sensor, illustrated schematically at 50, for sensing an event for which inflation of the air bag 14 is desired, such as a collision. The inflator 32 is operatively connected to the sensor 50 via lead wires 52.

The air bag 14 can be constructed of any suitable material, such as nylon (e.g., woven nylon 6-6 yarns), and may be constructed in any suitable manner. For example, the air bag 14 may include one or more pieces or panels of material. If more than one piece or panel is used, the pieces or panels may be interconnected by known means, such as stitching, ultrasonic welding, heat bonding, or adhesives, to form the air bag. The air bag 14 may be uncoated, coated with a material, such as a gas impermeable urethane, or laminated with a material, such as a gas impermeable film. The air bag 14 thus may have a gas-tight or substantially gas-tight construction. Those skilled in the art will appreciate that alternative materials, such as polyester yarn, and alternatives coatings, such as silicone, may also be used to construct the air bag 14.

Upon sensing the occurrence of an event for which inflation of the air bag 14 is desired, such as a vehicle collision, the sensor 50 provides a signal to the inflator 32 via the lead wires 52. Upon receiving the signal from the sensor 50, the inflator 32 is actuated and provides inflation fluid to the inflatable volume 54 of the air bag 14 in a known manner. The inflating air bag 14 exerts a force on the door 40, which moves the door to the opened condition. The air bag 14 inflates from the stored condition to a deployed condition, such as the fully inflated and deployed condition illustrated in solid lines in FIG. 1. The air bag 14, while inflated, helps protect the vehicle occupant 20 from impacts with parts of the vehicle 12, such as the instrument panel 36.

The air bag 14 may have one or more actuatable features for helping to control or tailor inflation of the air bag in response to vehicle conditions, occupant conditions, or both. These features may be actuatable actively, for example, in response to conditions determined via active sensors, or passively, for example, having a configuration responsive to physical conditions at the time of inflation. Examples of such actuatable features are illustrated in FIGS. 2-14.

Referring to FIGS. 2-5, the air bag 14 includes an adaptive tether 100 for adapting the configuration of the air bag 14 depending on vehicle or occupant conditions in the vehicle 12. The adaptive tether 100 is a three-leg tether that includes an anchor tether 102, a shaping tether 104, and a trigger tether 106.

The anchor tether 102 has a first end portion 110 anchored to the vehicle. Anchoring the anchor tether 102 to the vehicle 12 could be achieved in a variety of manners. The anchor tether 102 could, for example, be secured to the air bag 14 (e.g., a rear panel of the air bag) or to structure of the vehicle 12, such as the air bag module 30 (e.g., the canister 34) or the instrument panel 36. The shaping tether 104 has a first end portion 112 secured to a panel, such as a front panel 114, of the air bag 14. In the embodiment illustrated in FIGS. 2-5, the first end portion 112 of the shaping tether 104 is connected to an upper portion 116 of the front panel 114 of the air bag 14. The trigger tether 106 has a first end portion 120 secured to a panel, such as the front panel 114, of the air bag 14. In the embodiment illustrated in FIGS. 2-5, the first end portion 120 of the trigger tether 106 is connected to a mid or lower portion 122 of the front panel 114 of the air bag 14.

Figure 4:
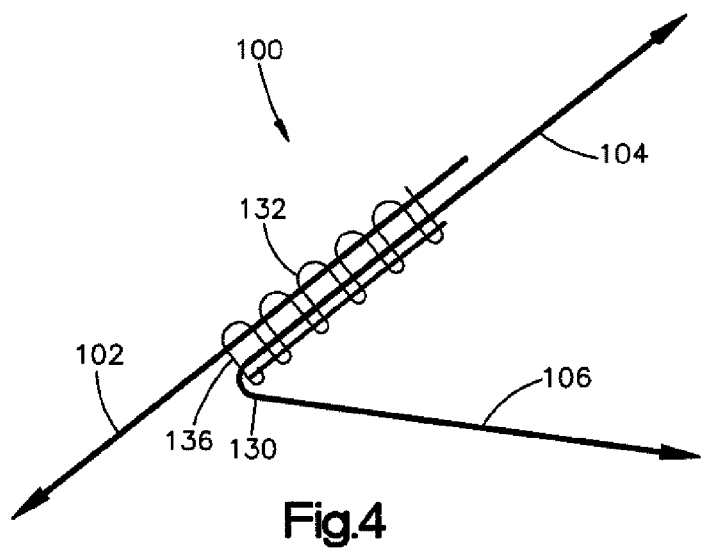
FIGS. 4, 5A and 5B are schematic illustrations of a portion of the apparatus of FIGS. 2 and 3.

In an unactuated condition of the adaptive tether 100, the anchor tether 102, shaping tether 104, and trigger tether 106 are interconnected. This is shown in detail in FIGS. 4 and 5. As shown in FIG. 4, the shaping tether 104 and trigger tether 106 are segments of a single length of tether material 130. The anchor tether 102 is a separate length of tether material. Releasable tear stitching 132 interconnects the anchor tether 102 to the tether material 130 at or near the interface between the shaping tether 104 and trigger tether 106.

Figures 5A, 5B:
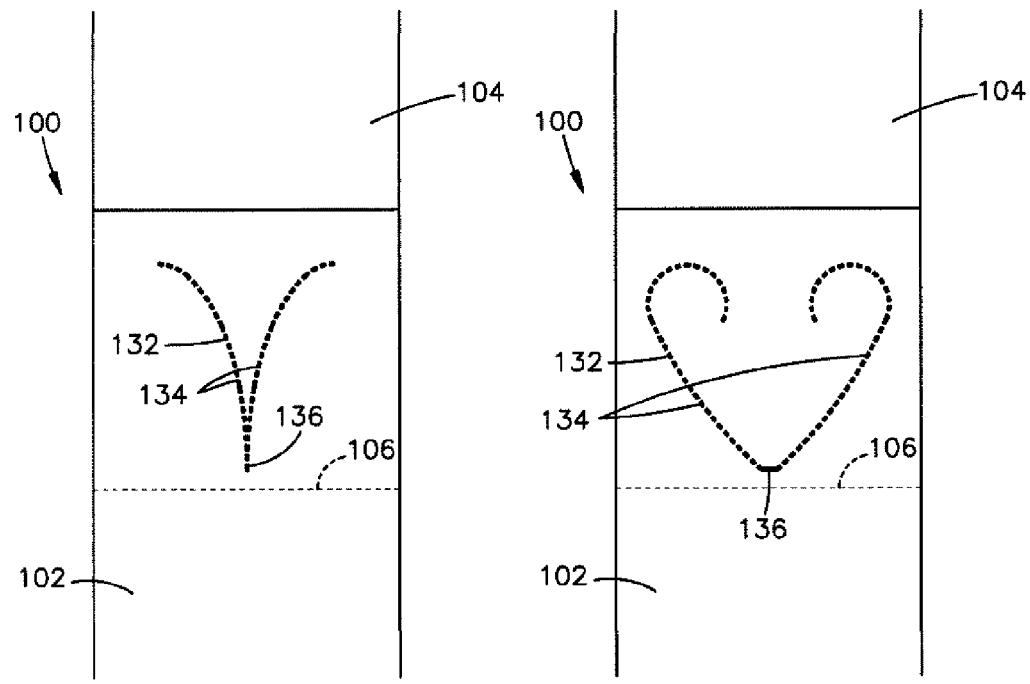

According to the present invention, a rupturable tear stitch configuration that promotes predictability, repeatability, and reliability in releasing interconnected fabrics is used to form the tear stitching 132. FIGS. 4, 5A and 5B illustrate by way of example tear stitching 132 in accordance with the present invention.

FIGS. 5A and 5B illustrate by way of example tear stitching that may be used to connect the anchor tether 102, shaping tether 104, and trigger tether 106. As viewed in FIG. 5A, the tear stitching 132 has an inverted, generally curved V-shaped configuration with outwardly diverging curved segments 134 or legs that meet at the break point 136. The tear stitching 132 is configured to rupture in response to the tension applied to the shaping tether 104 and the trigger tether 106 during deployment of the air bag 14. As viewed in FIG. 5B, the tear stitching 132 has an inverted, generally curved V-shaped configuration with inwardly diverging curved segments 134 or legs that meet at the break point 136. The tear stitching 132 is configured to rupture in response to the tension applied to the shaping tether 104 and the trigger tether 106 during deployment of the air bag 14.

According to the present invention, the tear stitching 132 is adapted to release the connection between the anchor tether 102 and the shaping and trigger tethers 104 and 106, depending on conditions in the vehicle 12 when the air bag 14 is deployed. The configuration of the tear stitching 132 and the locations where the shaping tether 104 and trigger tether 106 are connected to the air bag 14 are selected such that the stitching has a strength that differs depending on which of the shaping tether or trigger tether are tensioned. The air bag 14 and adaptive tether 100 are constructed and arranged such that the amount of tension sufficient to rupture the tear stitching differs between the shaping tether 104 and trigger tether 106.

Referring to FIGS. 4 and 5, tension applied to the tear stitching 132 by the shaping tether 104 acts generally parallel to the anchor tether 102. This helps distribute the tension force over the curved segments 134 of the tear stitching 132. The tear stitching 132 may thus offer a relatively high resistance to rupture in response to tension applied by the shaping tether 104 (referred to herein as "shaping strength").

Tension applied to the tear stitching 132 by the trigger tether 106 acts at an angle to the anchor tether 102 and thus produces a "peeling" force or action between the tether material 130 (i.e., the shaping tether 104 and trigger tether 106) and the anchor tether 102. This peeling action helps focus the tension on the break point 136 of the tear stitching 132. The tear stitching 132 may thus offer a relatively lower resistance rupture in response to tension applied by the trigger tether 106 (referred to herein as "trigger strength"). Thus, for example, the rupture strength of the tear stitching 132 may be selected to rupture in response to a force of about 100 Newtons applied by the trigger tether 106. In contrast, the shaping strength of the tear stitching 132 may be selected to rupture in response to a force of about 2000 Newtons applied by the shaping tether 104.

It can thus be seen that when the trigger tether 106 is tensioned in a direction angled with respect to the anchor tether, the resulting "peeling" action, focusing the tension on the break point 136, causes the tear stitching 132 to initially rupture at that point. The rupture then travels along the curved segments 134 until the trigger tether 106 and shaping tether 104 are released from the anchor tether 102.

The shaping strength and trigger strength of the tear stitching 132 can be tailored to desired values through a variety of configurable characteristics. For example, the material used to construct the tear stitching 132 may be selected to have material properties that help provide the desired shaping and tear strengths. Also, stitching itself (i.e., stitches per inch, type of stitch) may be selected to have material properties that help provide the desired shaping and tear strengths. Further, the shape of the tear stitching 132 may differ from the V-shaped configurations illustrated in FIGS. 5A and 5B and may be selected to have material properties that help provide the desired shaping and tear strengths.

When an event occurs which inflation of the air bag 14 is desired, the adaptive tether 100 respond to vehicle conditions, occupant conditions, or both to help control inflation and deployment of the air bag. According to the embodiment of FIGS. 2-5B, this control is implemented passively through the physical construction or configuration of the air bag 14 and adaptive tether 100. For example, the air bag 14 may be constructed to respond to the size or position of the vehicle occupant 20. This is illustrated in FIGS. 2 and 3.

Figure 2:
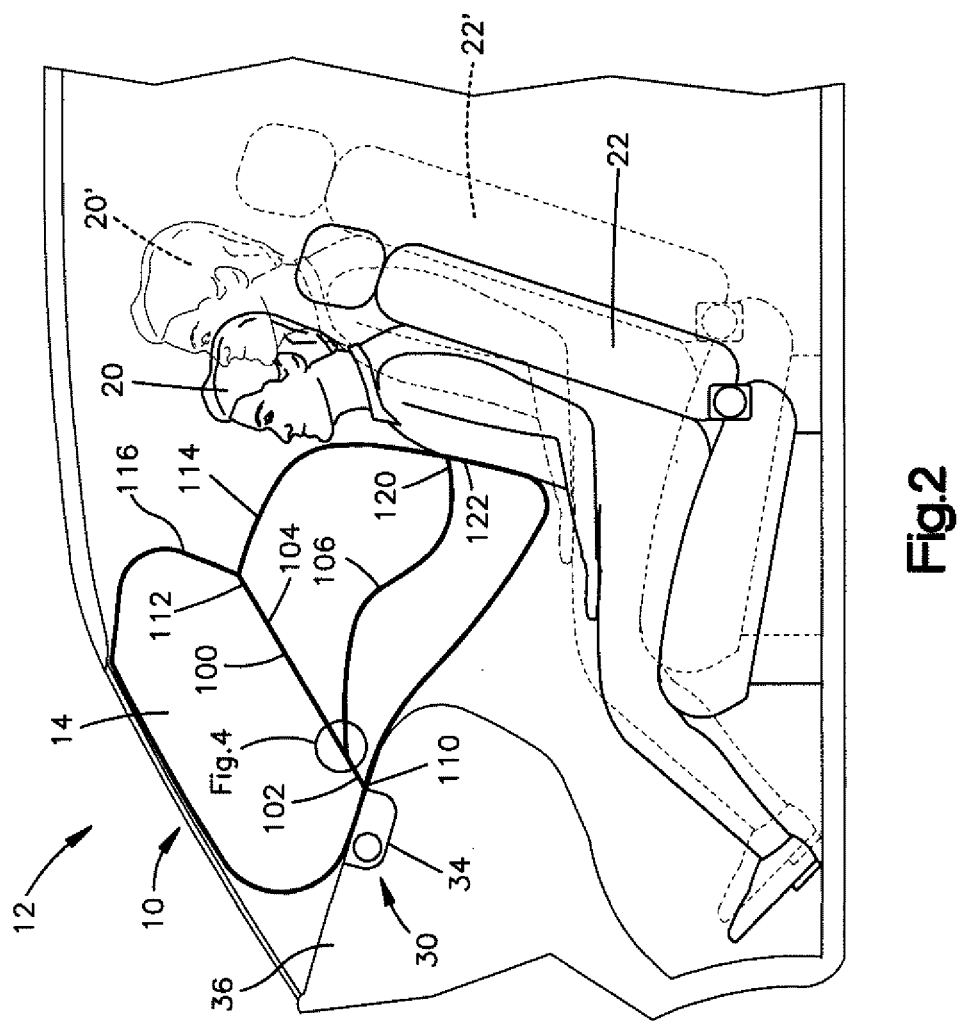
FIGS. 2 and 3 are schematic side views illustrating a first embodiment of an apparatus for helping to protect an occupant of a vehicle, illustrating the apparatus in different conditions, according to the present invention.
Figure 3:
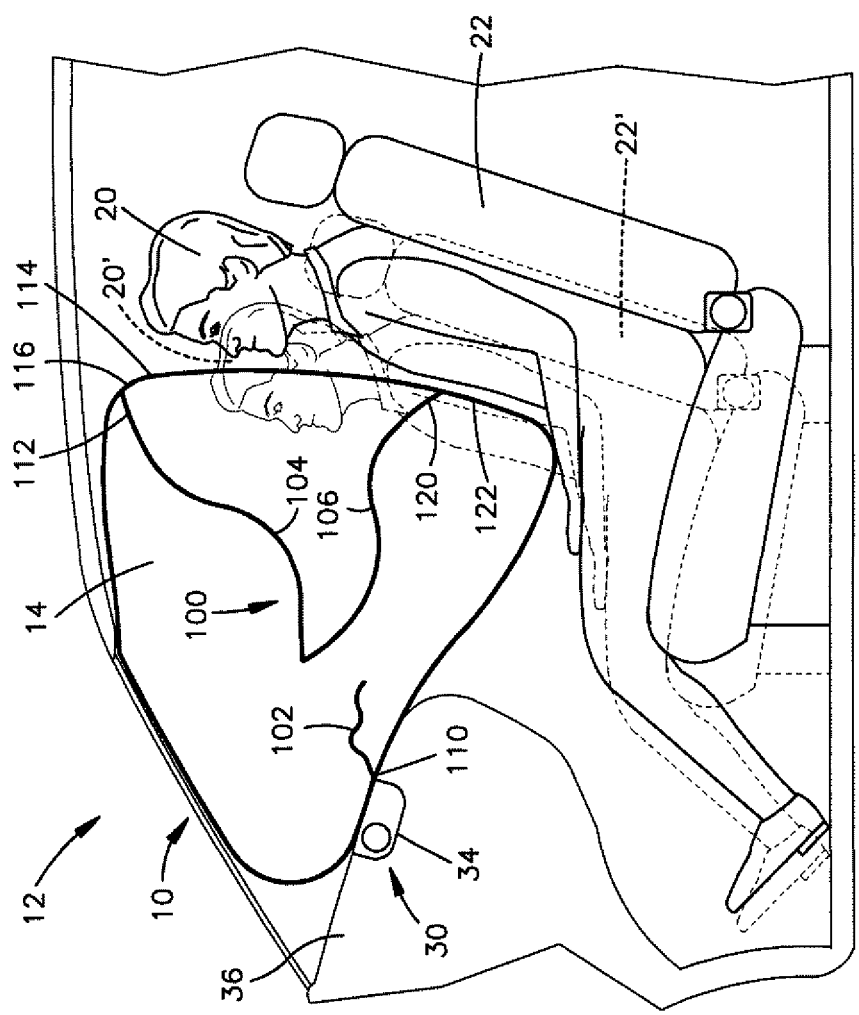

Referring to FIG. 2, the occupant 20 is positioned relatively close to the instrument panel 36 and therefore relatively close to the air bag module 30. This may be the case, for example, with a relatively small occupant, such as a child or small female occupant. For reference, a large occupant 20' such as an average size or large adult male is illustrated in dashed lines. Those skilled in the art will appreciate that the smaller occupant 20 may adjust the vehicle seat 22 to a position forward of the seat 22' of the larger occupant 20'.

As shown in FIG. 2, in the case of a forward positioned occupant 20, the mid/lower portion 122 of the front panel 114 of the air bag 14 engages the occupant during deployment. As shown, the forward positioned occupant 20 prevents the mid/lower portion 122 from deploying fully and thereby prevents the trigger tether 106 from becoming tensioned. As a result, the trigger tether 106 does not apply any significant tension or force on the tear stitching 132 (see FIGS. 4 and 5).

On the other hand, also shown in FIG. 2, in the case of a forward positioned occupant 20, the upper portion 116 of the front panel 114 of the air bag 14 does not engage the occupant during deployment. The forward positioned occupant 20 does not inhibit deployment of the upper portion 116 from deploying fully and, thus, the shaping tether 104 and anchor tether 102 become tensioned by the deploying front panel 114 of the air bag 14. As a result, the tension in the shaping tether 104 and anchor tether 102 is applied to the tear stitching 132, which connects the two tethers.

Since, as described above, the tear stitching 132 has a relatively high shaping strength configured to withstand relatively high tension forces between the shaping tether 104 and the anchor tether 102, the tear stitching does not rupture in the event of the forward positioned occupant of FIG. 2. The shaping tether 104 helps maintain the shape of the air bag illustrated in FIG. 2. Those having skill in the art will appreciate that the shaping tether 104 helps maintain the upper portion 116 of the front panel 114 positioned away from the forward positioned occupant's head.

Referring to FIG. 3, the occupant 20 is positioned away from the instrument panel 36 and therefore relatively far from to the air bag module 30. This may be the case, for example, with a relatively large occupant, such as an adult male occupant. For reference, a small occupant 20' such as a child or small female occupant in a forward seat position is illustrated in dashed lines. Those skilled in the art will appreciate that the larger occupant 20 may adjust the vehicle seat 22 to a position rearward of the seat 22' of the smaller occupant 20'.

As shown in FIG. 3, in the case of a rearward positioned occupant 20, the occupant does not impede deployment of the mid/lower portion 122 of the front panel 114 of the air bag 14. The mid/lower portion 122 is free to deploy to a fully deployed position. As a result, the trigger tether 106 becomes tensioned under the force of the deploying front panel 114 and the trigger tether 106 applies a significant tension or force on the tear stitching 132 (see FIGS. 4 and 5).

Since, as described above, the tear stitching 132 has a relatively low trigger strength configured to rupture under relatively low tension forces between the trigger tether 106 and the anchor tether 102, the tear stitching ruptures in the event of the rearward positioned occupant of FIG. 3. This releases the connection between the anchor tether 102 and the shaping tether 104. As a result, the shaping tether 104 does not maintain the shape of the air bag 14 and the air bag is permitted to inflate to the fully deployed position illustrated in FIG. 3.

In view of the above, those skilled in the art will appreciate that, according to the present invention, the adaptive tether 100 shapes or restricts deployment of the air bag 14 in the event of a forward positioned occupant and permits full deployment in the event of a rearward positioned occupant. Those skilled in the art will also appreciate that the adaptive function of the tether 100 is not limited to forward/rearward occupant position per se. For example, the adaptive tether 100 could function similarly to shape or restrict deployment of the air bag 14 in the event of a child safety seat positioned on the vehicle seat 22. Also, the adaptive tether 100 could function similarly to shape or restrict deployment of the air bag 14 in the event of an extremely large occupant, without regard to the forward/rearward position of the seat 22. Further, the adaptive tether 100 could function similarly to shape or restrict deployment of the air bag 14 in the event of an occupant positioned away from a normal seating position, such as a leaned-over or leaned-forward position, without regard to the forward/rearward position of the seat 22 and without regard to the occupant's size.

Figure 6:
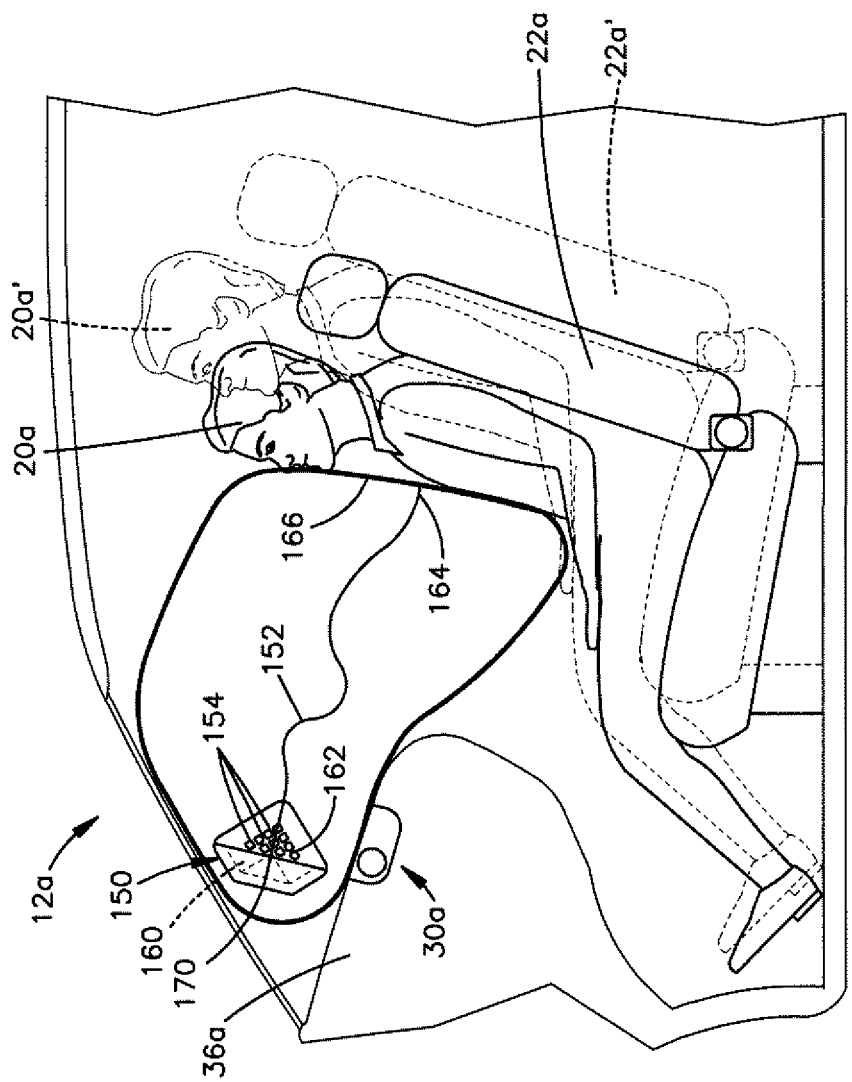
FIGS. 6 and 7 are schematic side views illustrating a second embodiment of an apparatus for helping to protect an occupant of a vehicle, illustrating the apparatus in different conditions, according to the present invention.
Figure 7:
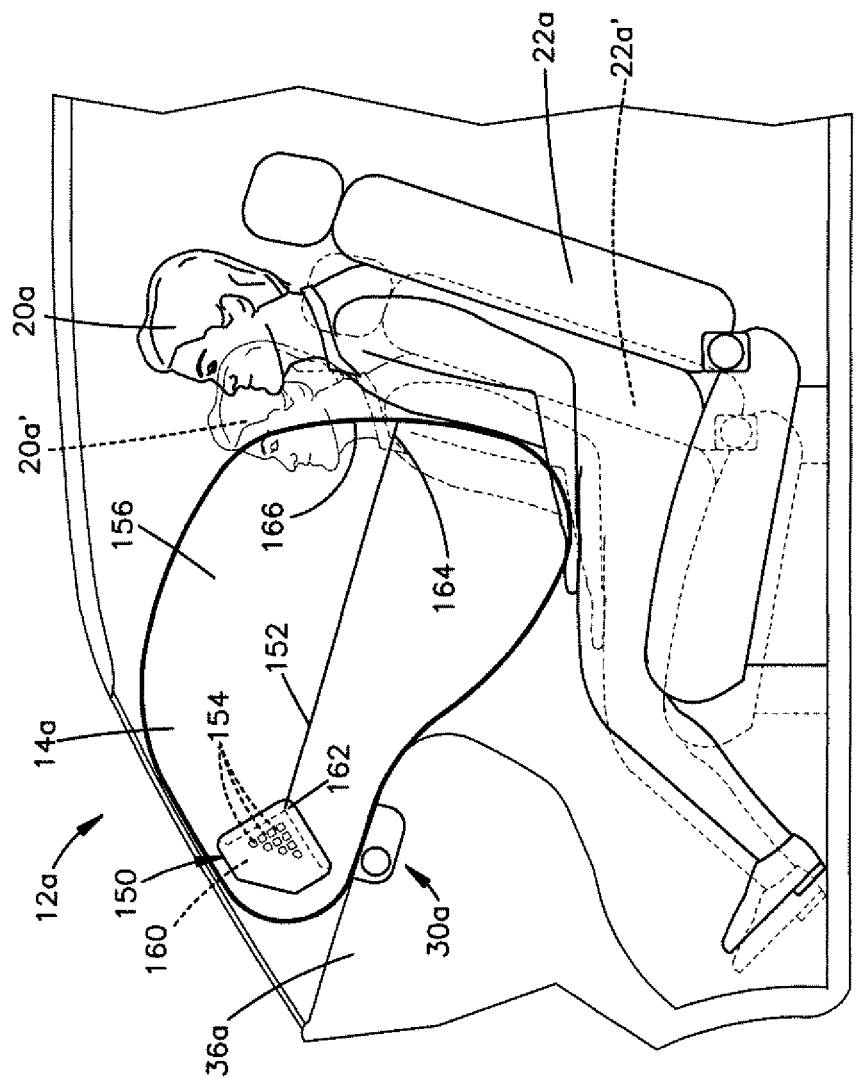

A second embodiment of the present invention is illustrated in FIGS. 6 and 7. Certain components in FIGS. 6 and 7 are similar or identical to components of FIGS. 2-5. The suffix "a" is added to the reference numbers of these similar or identical components in FIGS. 6 and 7 to avoid confusion.

Referring to FIGS. 6 and 7, the air bag 14a includes a vent 150 that is selectively actuatable to release inflation fluid from the inflatable volume of the air bag 14a. The air bag 14a includes an adaptive tether 152 that is operative to actuate the vent 150 in response to vehicle and occupant conditions at the time the air bag is deployed. The vent 150 thus may selectively release inflation fluid from the air bag 14a depending on these conditions.

The vent 150 may have various configurations. In the embodiment illustrated in FIGS. 6 and 7, the vent 150 includes one or more vent openings 154 formed in a panel 156, such as a side panel, of the air bag 14a. A vent door 160 is secured to the side panel 156. The adaptive tether 152 has a first end portion 162 secured to the vent door 160 and a second end portion 164 secured to a panel 166 of the air bag 14a, such as a front panel.

The vent door 160 is secured to the panel 156 by known means (not shown), such as stitching, ultrasonic welding, heat bonding, or adhesives. The vent 150 has an open condition (FIG. 6) in which the vent door 160 is positioned away from the vent openings 154 and thereby permits inflation fluid to vent, i.e., flow, through the vent openings. In the open condition, the vent door 160 is folded away from the vent openings 154 and held in place by a releasable tear stitch 170.

The air bag 14a, vent 150, and tether 152 are constructed and arranged to adapt to vehicle and occupant conditions in the vehicle 12a at the time the air bag is deployed. If, upon the occurrence of an event for which inflation of the air bag 14a is desired, the occupant 20a is a forward positioned occupant, such as a small female or child, the panel 166 of the air bag 14a may engage the occupant before reaching the fully deployed position. In this event, as shown in FIG. 6, this helps prevent the tether from becoming fully tensioned. This prevents the tether from pulling on the vent door 160 and the vent 150 remains in the open condition. As a result, inflation fluid is permitted to vent from the inflatable volume of the air bag 14a.

If, upon the occurrence of an event for which inflation of the air bag 14a is desired, the occupant 20a is a rearward positioned occupant, such as a large male, the panel 166 of the air bag 14a does not engage the occupant before reaching the fully deployed position. In this event, as shown in FIG. 7, the air bag 14a inflates and pressurizes to the fully deployed condition. As this occurs, the tether 152 becomes tensioned. When the air bag 14a reaches a threshold pressure, the tension on the tether 152 causes the tear stitching 170 to rupture, which releases the vent door 160 to move into the position illustrated in FIG. 7, covering the vent openings 154 and thereby preventing inflation fluid from venting from the inflatable volume. The air bag 14a thus reaches the fully deployed and pressurized condition illustrated in FIG. 7.

In view of the above, those skilled in the art will appreciate that, according to the present invention, the adaptive tether 152 acts to vent inflation fluid from the air bag 14a in the event of a forward positioned occupant and permits blocks venting of inflation fluid in the event of a rearward positioned occupant. Those skilled in the art will also appreciate that the adaptive function of the tether 152 is not limited to forward/rearward occupant position per se. For example, the adaptive tether 152 could function similarly to permit venting in the event of a child safety seat positioned on the vehicle seat 22a. Also, the adaptive tether 152 could function similarly to block venting in the event of an extremely large occupant, without regard to the forward/rearward position of the seat 22a. Further, the adaptive tether 152 could function similarly to permit venting in the event of an occupant positioned away from a normal seating position, such as a leaned-over or leaned-forward position, without regard to the forward/rearward position of the seat 22a.

A third embodiment of the present invention is illustrated in FIGS. 8-11. Certain components in FIGS. 8-11 are similar or identical to components of FIGS. 2-7. The suffix "b" is added to the reference numbers of these similar or identical components in FIGS. 8-11 to avoid confusion. The embodiment of FIGS. 8-11 combines features of the embodiments of FIGS. 2-7.

Referring to FIGS. 8-11, the air bag 14b includes an adaptive tether 200 for adapting the configuration of the air bag 14b depending on vehicle or occupant conditions in the vehicle 12b. The adaptive tether 200 includes an anchor tether 202, a shaping tether 204, a trigger tether 206, and a vent tether 252.

The construction and arrangement of the adaptive tether 200 is essentially the same as that described in the first embodiment of FIGS. 2-5. The anchor tether 202 has a first end portion secured to the air bag 14b (e.g., a rear panel of the air bag) or to structure of the vehicle 12b, such as the air bag module 30b (e.g., the canister 34b) or the instrument panel 36b. The shaping tether 204 has a first end portion 212 secured to a panel, such as a front panel 214, of the air bag 14b. The first end portion 212 of the shaping tether 204 is connected to an upper portion 216 of the front panel 214 of the air bag 14b. The trigger tether 206 has a first end portion 220 secured to a panel, such as the front panel 214, of the air bag 14b. In the embodiment illustrated in FIGS. 2-5, the first end portion 220 of the trigger tether 206 is connected to a mid or lower portion 222 of the front panel 214 of the air bag 14b.

In an unactuated condition of the adaptive tether 200, the anchor tether 202, shaping tether 204, and trigger tether 206 are interconnected. This is shown in detail in FIGS. 10 and 11. As shown in FIG. 10, the shaping tether 204 and trigger tether 206 are segments of a single length of tether material 230. The anchor tether 202 is a separate length of tether material. Releasable tear stitching 232 interconnects the anchor tether 202 to the tether material 230 at or near the interface between the shaping tether 204 and trigger tether 206.

According to the present invention, a rupturable tear stitch configuration that promotes predictability, repeatability, and reliability in releasing interconnected fabrics is used to form the tear stitching 232. FIGS. 10, 11A, and 11B illustrate by way of example tear stitching 232 in accordance with the present invention.

FIGS. 11A and 11B illustrate by way of example tear stitching that may be used to connect the anchor tether 202, shaping tether 204, and trigger tether 206. As viewed in FIG. 11A, the tear stitching 232 has an inverted, generally curved V-shaped configuration with outwardly diverging curved segments 234 or legs that meet at the break point 236. The tear stitching 232 is configured to rupture in response to the tension applied to the shaping tether 204 and the trigger tether 206 during deployment of the air bag 14b. As viewed in FIG. 11B, the tear stitching 232 has an inverted, generally curved V-shaped configuration with inwardly diverging curved segments 234 or legs that meet at the break point 236. The tear stitching 232 is configured to rupture in response to the tension applied to the shaping tether 204 and the trigger tether 206 during deployment of the air bag 14b.

According to the present invention, the tear stitching 232 is adapted to release the connection between the anchor tether 202 and the shaping and trigger tethers 204 and 206, depending on conditions in the vehicle 12b when the air bag 14b is deployed. The configuration of the tear stitching 232 and the locations where the shaping tether 204 and trigger tether 206 are connected to the air bag 14b are selected such that the stitching has a strength that differs depending on which of the shaping tether or trigger tether are tensioned. The air bag 14b and adaptive tether 200 are constructed and arranged such that the amount of tension sufficient to rupture the tear stitching 232 differs between the shaping tether 204 and trigger tether 206.

Referring to FIGS. 10 and 11, tension applied to the tear stitching 232 by the shaping tether 204 acts generally parallel to the anchor tether 202. This helps distribute the tension force over the curved segments 234 of the tear stitching 232. The tear stitching 232 may thus offer a relatively high resistance rupture in response to tension applied by the shaping tether 204 (shaping strength).

Tension applied to the tear stitching 232 by the trigger tether 206 acts at an angle to the anchor tether 202 and thus produces a "peeling" force or action between the tether material 230 (i.e., the shaping tether 204 and trigger tether 206) and the anchor tether 202. This peeling action helps focus the tension on the break point 236 of the tear stitching 232. The tear stitching 232 may thus offer a relatively lower resistance rupture in response to tension applied by the trigger tether 206 (trigger strength). Thus, for example, the rupture strength of the tear stitching 232 may be selected to rupture in response to a force of about 100 Newtons applied by the trigger tether 206. In contrast, the shaping strength of the tear stitching 232 may be selected to rupture in response to a force of about 2000 Newtons applied by the shaping tether 204.

It can thus be seen that when the trigger tether 106 is tensioned in a direction angled with respect to the anchor tether, the resulting "peeling" action, focusing the tension on the break point 236, causes the tear stitching 232 to initially rupture at that point. The rupture then travels along the segments 234 until the trigger tether 206 and shaping tether 204 are released from the anchor tether 202.

The shaping strength and trigger strength of the tear stitching 232 can be tailored to desired values through a variety of configurable characteristics. For example, the material used to construct the tear stitching 232 may be selected to have material properties that help provide the desired shaping and tear strengths. Also, stitching itself (i.e., stitches per inch, type of stitch) may be selected to have material properties that help provide the desired shaping and tear strengths. Further, the shape of the tear stitching 232 may differ from the V-shaped configurations illustrated in FIGS. 11A and 11B and may be selected to have material properties that help provide the desired shaping and tear strengths.

Figure 8:
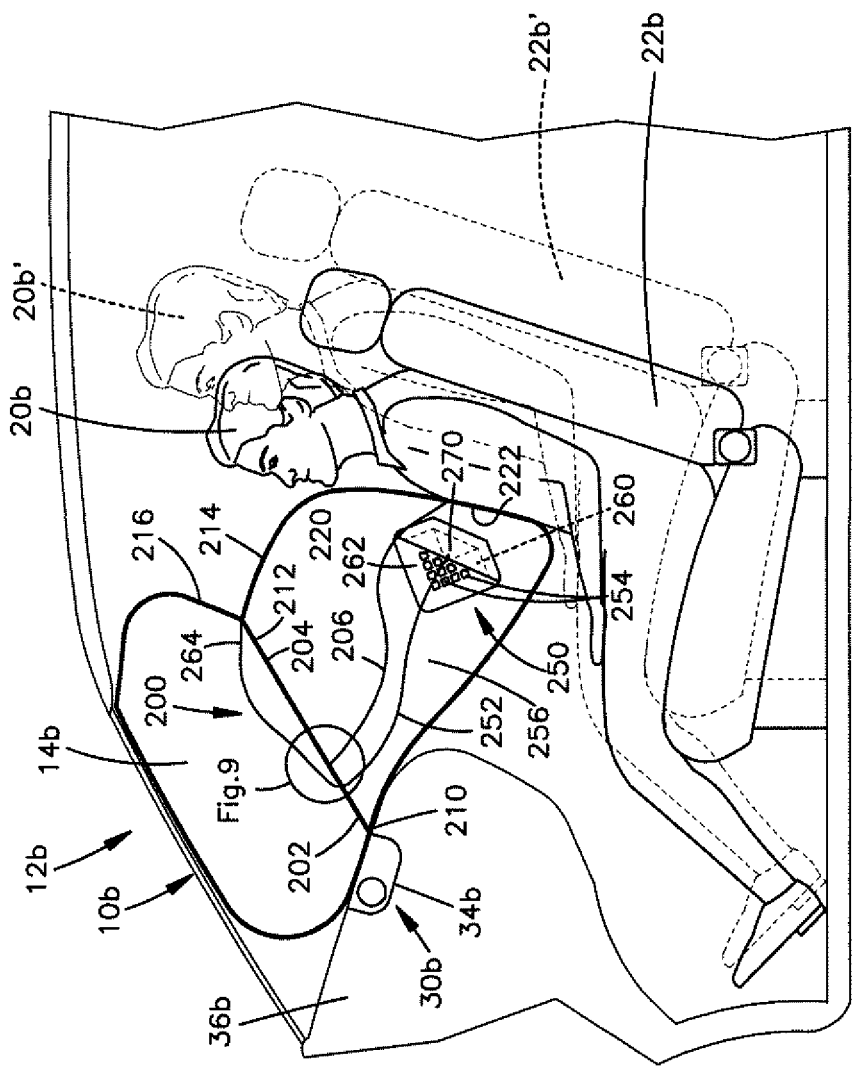
FIGS. 8 and 9 are schematic side views illustrating a third embodiment of an apparatus for helping to protect an occupant of a vehicle, illustrating the apparatus in different conditions, according to the present invention.
Figure 9:
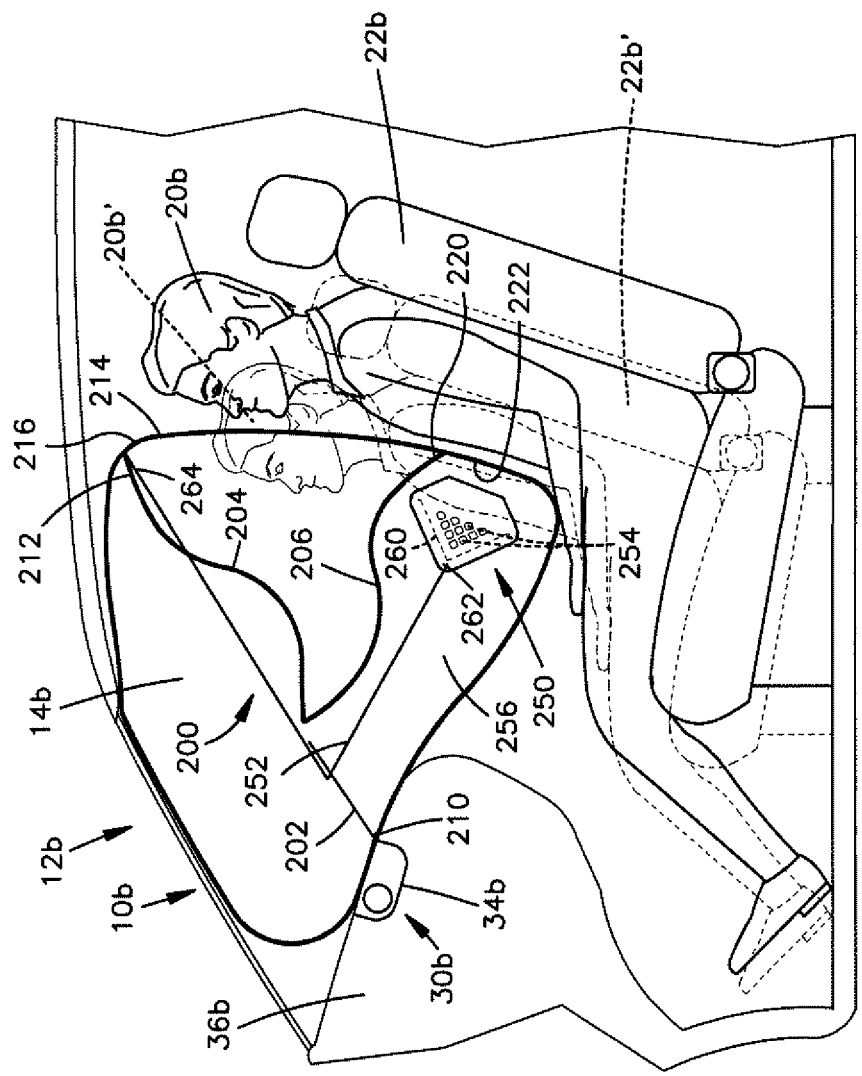

As shown in FIGS. 8 and 9, the air bag 14b also includes a vent 250 that is selectively actuatable to release inflation fluid from the inflatable volume of the air bag 14b. The adaptive tether 200 of the embodiments of FIGS. 8-11B includes a vent tether 252 that is operative to actuate the vent 250 in response to vehicle and occupant conditions at the time the air bag is deployed. The vent 250 thus may selectively release inflation fluid from the air bag 14b depending on these conditions.

The vent 250 may have various configurations. In the embodiment illustrated in FIGS. 8 and 9, the vent 250 has a construction similar or identical to the vent in FIGS. 6 and 7, with the exception that it is located at a different position on the air bag panel 256. The vent 250 includes one or more vent openings 254 formed in a panel 256, such as a side panel, of the air bag 14b. A vent door 260 is secured to the side panel 256. The vent tether 252 has a first end portion 262 secured to the vent door 260 and a second end portion 264 secured to a panel of the air bag 14a, such as the front panel 214 at or near the location where the shaping tether 204 is secured to the panel. As shown in FIGS. 10 and 11, the vent tether 252 has a central portion 272 that extends through an aperture 274 in the anchor tether 202.

The vent door 260 is secured to the panel 256 by known means (not shown), such as stitching, ultrasonic welding, heat bonding, or adhesives. The vent 250 has an open condition (FIG. 8) in which the vent door 260 is positioned away from the vent openings 254 and thereby permits inflation fluid to vent, i.e., flow, through the vent openings. In the open condition, the vent door 260 is folded away from the vent openings 254 and held in place by a releasable tear stitch 270.

When an event occurs which inflation of the air bag 14b is desired, the adaptive tether 200 respond to vehicle conditions, occupant conditions, or both to help control inflation and deployment of the air bag. According to the embodiment of FIGS. 8-11, this control is implemented passively through the physical construction or configuration of the air bag 14b and adaptive tether 200. For example, the air bag 14b may be constructed to respond to the size or position of the vehicle occupant 20b. This is illustrated in FIGS. 8 and 9.

Referring to FIG. 8, the occupant 20b is positioned relatively close to the instrument panel 36b and therefore relatively close to the air bag module 30b. This may be the case, for example, with a relatively small occupant, such as a child or small female occupant. For reference, a large occupant 20b' such as an average size or large adult male is illustrated in dashed lines. Those skilled in the art will appreciate that the smaller occupant 20b may adjust the vehicle seat 22b to a position forward of the seat 22b' of the larger occupant 20b'.

As shown in FIG. 8, in the case of a forward positioned occupant 20b, the mid/lower portion 222 of the front panel 214 of the air bag 14b engages the occupant during deployment. As shown, the forward positioned occupant 20b prevents the mid/lower portion 222 from deploying fully and thereby prevents the trigger tether 206 from becoming tensioned. As a result, the trigger tether 206 does not apply any significant tension or force on the tear stitching 232 sufficient to rupture the tear stitching 232 (see FIGS. 8 and 9).

On the other hand, also shown in FIG. 8, in the case of a forward positioned occupant 20b, the upper portion 216 of the front panel 214 of the air bag 14b does not engage the occupant during deployment. The forward positioned occupant 20b does not inhibit deployment of the upper portion 216 from deploying fully and, thus, the shaping tether 204 and anchor tether 202 become tensioned by the deploying front panel 214 of the air bag 14b. As a result, the tension in the shaping tether 204 and anchor tether 202 is applied to the tear stitching 232, which connects the two tethers.

Since, as described above, the tear stitching 232 has a high shaping strength configured to withstand relatively high tension forces between the shaping tether 204 and the anchor tether 202, the tear stitching does not rupture in the event of the forward positioned occupant of FIG. 8. The shaping tether 204 helps maintain the shape of the air bag illustrated in FIG. 8. Those having skill in the art will appreciate that the shaping tether 204 helps maintain the upper portion 216 of the front panel 214 positioned away from the forward positioned occupant's head.

Also, in the case of a forward positioned occupant 20b, since the shaping tether 204 maintains the shape of the air bag as shown in FIG. 8, the vent tether 252 does not become tensioned and does not pull on the vent door 260. This is because the shaping tether 204 restricts full deployment of the upper portion 216 of the front panel 214 and thereby prevents the front panel from tensioning the vent tether 252. Thus, the vent 250 remains in the open condition. As a result, in the case of the forward positioned occupant 20b of FIG. 8, inflation fluid is permitted to vent from the inflatable volume of the air bag 14b.

Referring to FIG. 9, the occupant 20b is positioned away from the instrument panel 36b and therefore relatively far from to the air bag module 30b. This may be the case, for example, with a relatively large occupant, such as an adult male occupant. For reference, a small occupant 20b' such as a child or small female occupant in a forward seat position is illustrated in dashed lines. Those skilled in the art will appreciate that the larger occupant 20b may adjust the vehicle seat 22 to a position rearward of the seat 22b' of the smaller occupant 20b'.

As shown in FIG. 9, in the case of a rearward positioned occupant 20b, the occupant does not impede deployment of the mid/lower portion 222 of the front panel 214 of the air bag 14b. The mid/lower portion 222 is free to deploy to a fully deployed position. As a result, the trigger tether 206 becomes tensioned under the force of the deploying front panel 214 and the trigger tether 206 applies a significant tension or force on the tear stitching 232 (see FIGS. 8 and 9).

Since, as described above, the tear stitching 232 has a relatively low trigger strength configured to rupture under relatively low tension forces between the trigger tether 206 and the anchor tether 202, the tear stitching ruptures in the event of the rearward positioned occupant of FIG. 9. This releases the connection between the anchor tether 202 and the shaping tether 204. As a result, the shaping tether 204 does not maintain the shape of the air bag 14b and the air bag is permitted to inflate to the fully deployed position illustrated in FIG. 9.

Also, in the case of a rearward positioned occupant 20b, since the shaping tether is released and the air bag 14b is permitted to reach the fully inflated and deployed position, the vent tether 252 becomes tensioned in response to full deployment of the upper portion 216 of the front panel 214. When the air bag 14b reaches a threshold pressure, the tension on the vent tether 252 causes the tear stitching 270 to rupture, which releases the vent door 260 to move into the position illustrated in FIG. 9, covering the vent openings 254 and thereby preventing inflation fluid from venting from the inflatable volume. The air bag 14b thus reaches the fully deployed and pressurized condition illustrated in FIG. 9.

In view of the above, those skilled in the art will appreciate that, according to the present invention, the adaptive tether 200 acts to shape the air bag 14b and to vent inflation fluid from the air bag 14b in the event of a forward positioned occupant and blocks shaping of the air bag and venting of inflation fluid in the event of a rearward positioned occupant. Those skilled in the art will also appreciate that the adaptive function of the tether 200 is not limited to forward/rearward occupant position per se. For example, the adaptive tether 200 could function similarly to permit shaping and venting in the event of a child safety seat positioned on the vehicle seat 22b. Also, the adaptive tether 200 could function similarly to block shaping and venting in the event of an extremely large occupant, without regard to the forward/rearward position of the seat 22b. Further, the adaptive tether 200 could function similarly to permit shaping and venting in the event of an occupant positioned away from a normal seating position, such as a leaned-over or leaned-forward position, without regard to the forward/rearward position of the seat 22b and without regard to the occupant's size.

A fourth embodiment of the present invention is illustrated in FIGS. 12-15. Certain components in FIGS. 12-15 are similar or identical to components of FIGS. 2-11. The suffix "c" is added to the reference numbers of these similar or identical components in FIGS. 12-15 to avoid confusion.

Referring to FIGS. 12-15, the air bag 14c includes an adaptive tether 300 for adapting the configuration of the air bag 14c depending on vehicle or occupant conditions in the vehicle 12b. The adaptive tether 300 includes an anchor tether 302, a shaping tether 304, a trigger tether 306, and a vent tether 352. The construction and arrangement of the adaptive tether 300 is essentially the same as that described in the first embodiment of FIGS. 2-11. In essence, the apparatus of FIGS. 12-15 combines the features of the first and second embodiments of FIGS. 2-7.

The anchor tether 302 has a first end portion secured to the air bag 14c (e.g., a rear panel of the air bag) or to structure of the vehicle 12b, such as the air bag module 20c (e.g., the canister 34c) or the instrument panel 36c. The shaping tether 304 has a first end portion 312 secured to a panel, such as a front panel 314, of the air bag 14c. The first end portion 312 of the shaping tether 304 is connected to an upper portion 316 of the front panel 314 of the air bag 14c. The trigger tether 306 has a first end portion 320 secured to a panel, such as the front panel 314, of the air bag 14c. In the embodiment illustrated in FIGS. 12-15, the first end portion 320 of the trigger tether 306 is connected to a mid or lower portion 322 of the front panel 314 of the air bag 14c.

In an unactuated condition of the adaptive tether 300, the anchor tether 302, shaping tether 104, and trigger tether 306 are interconnected. This is shown in detail in FIGS. 14 and 15.

As shown in FIG. 14, the shaping tether 304 and trigger tether 306 are segments of a single length of tether material 330. The anchor tether 302 is a separate length of tether material. Releasable tear stitching 332 interconnects the anchor tether 302 to the tether material 330 at or near the interface between the shaping tether 304 and trigger tether 306.

Figure 15A:
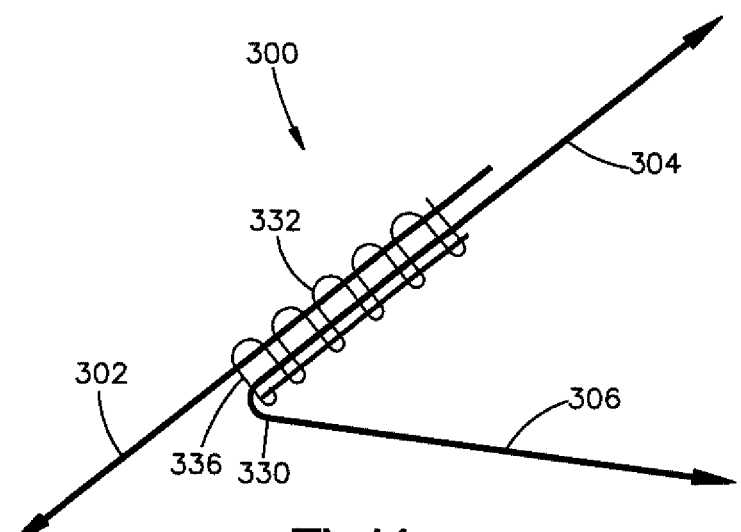
Figure 15B:
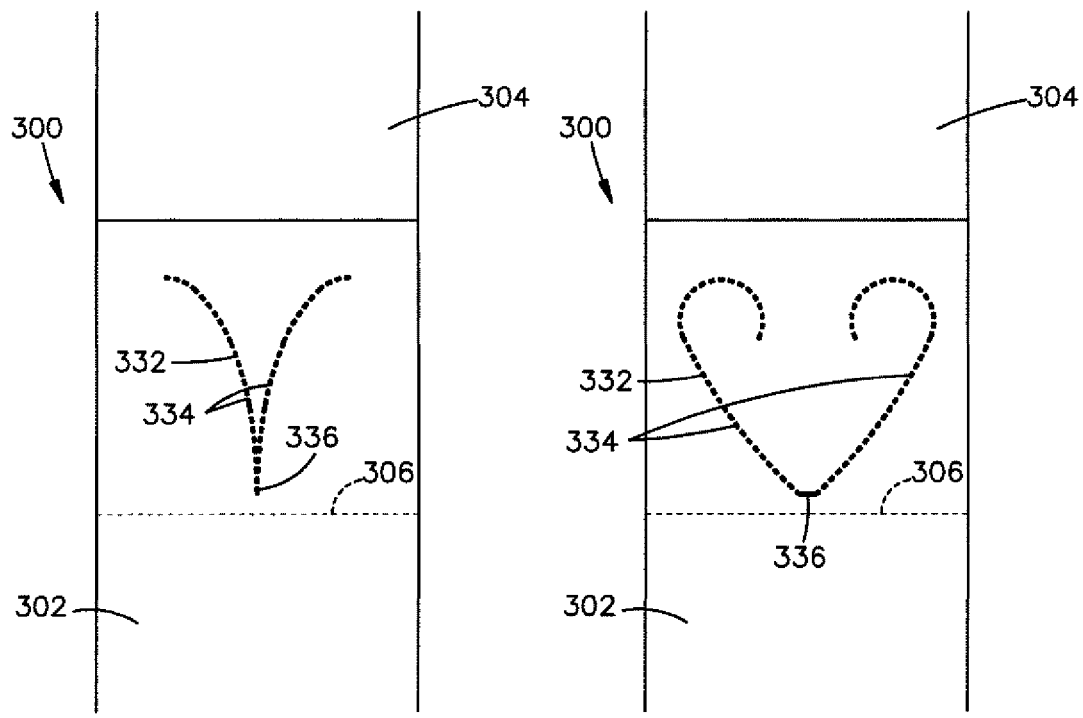

According to the present invention, a rupturable tear stitch configuration that promotes predictability, repeatability, and reliability in releasing interconnected fabrics is used to form the tear stitching 332. FIGS. 14, 15A, and 15B illustrate by way of example tear stitching 332 in accordance with the present invention.

FIGS. 15A and 15B illustrate by way of example tear stitching that may be used to connect the anchor tether 302, shaping tether 304, and trigger tether 306. As viewed in FIG. 15A, the tear stitching 332 has an inverted, generally curved V-shaped configuration with outwardly diverging curved segments 334 or legs that meet at the break point 336. The tear stitching 332 is configured to rupture in response to the tension applied to the shaping tether 304 and the trigger tether 306 during deployment of the air bag 14c. As viewed in FIG. 15B, the tear stitching 332 has an inverted, generally curved V-shaped configuration with inwardly diverging curved segments 334 or legs that meet at the break point 336. The tear stitching 332 is configured to rupture in response to the tension applied to the shaping tether 304 and the trigger tether 306 during deployment of the air bag 14c.

According to the present invention, the tear stitching 332 is adapted to release the connection between the anchor tether 302 and the shaping and trigger tethers 304 and 306, depending on conditions in the vehicle 12b when the air bag 14c is deployed. The configuration of the tear stitching 332 and the locations where the shaping tether 304 and trigger tether 306 are connected to the air bag 14c are selected such that the stitching has a strength that differs depending on which of the shaping tether or trigger tether are tensioned. The air bag 14c and adaptive tether 300 are constructed and arranged such that the amount of tension sufficient to rupture the tear stitching 332 differs between the shaping tether 304 and trigger tether 306.

Referring to FIGS. 10 and 11, tension applied to the tear stitching 332 by the shaping tether 304 acts generally parallel to the anchor tether 302. This helps distribute the tension force over the curved segments 334 of the tear stitching 332. The tear stitching 332 may thus offer a relatively high resistance rupture in response to tension applied by the shaping tether 304 (shaping strength).

Tension applied to the tear stitching 332 by the trigger tether 306 acts at an angle to the anchor tether 302 and thus produces a "peeling" force or action between the tether material 330 (i.e., the shaping tether 304 and trigger tether 306) and the anchor tether 302. This peeling action helps focus the tension on the break point 336 of the tear stitching 332. The tear stitching 332 may thus offer a relatively lower resistance rupture in response to tension applied by the trigger tether 306 (trigger strength). Thus, for example, the rupture strength of the tear stitching 332 may be selected to rupture in response to a force of about 100 Newtons applied by the trigger tether 306. In contrast, the shaping strength of the tear stitching 332 may be selected to rupture in response to a force of about 3000 Newtons applied by the shaping tether 304.

It can thus be seen that when the trigger tether 306 is tensioned in a direction angled with respect to the anchor tether, the resulting "peeling" action, focusing the tension on the break point 336, causes the tear stitching 332 to initially rupture at that point. The rupture then travels along the curved segments 334 until the trigger tether 306 and shaping tether 304 are released from the anchor tether 302.

The shaping strength and trigger strength of the tear stitching 332 can be tailored to desired values through a variety of configurable characteristics. For example, the material used to construct the tear stitching 332 may be selected to have material properties that help provide the desired shaping and tear strengths. Also, stitching itself (i.e., stitches per inch, type of stitch) may be selected to have material properties that help provide the desired shaping and tear strengths. Further, the shape of the tear stitching 332 may differ from the V-shaped configurations illustrated in FIGS. 15A and 15B and may be selected to have material properties that help provide the desired shaping and tear strengths.

Figure 12:
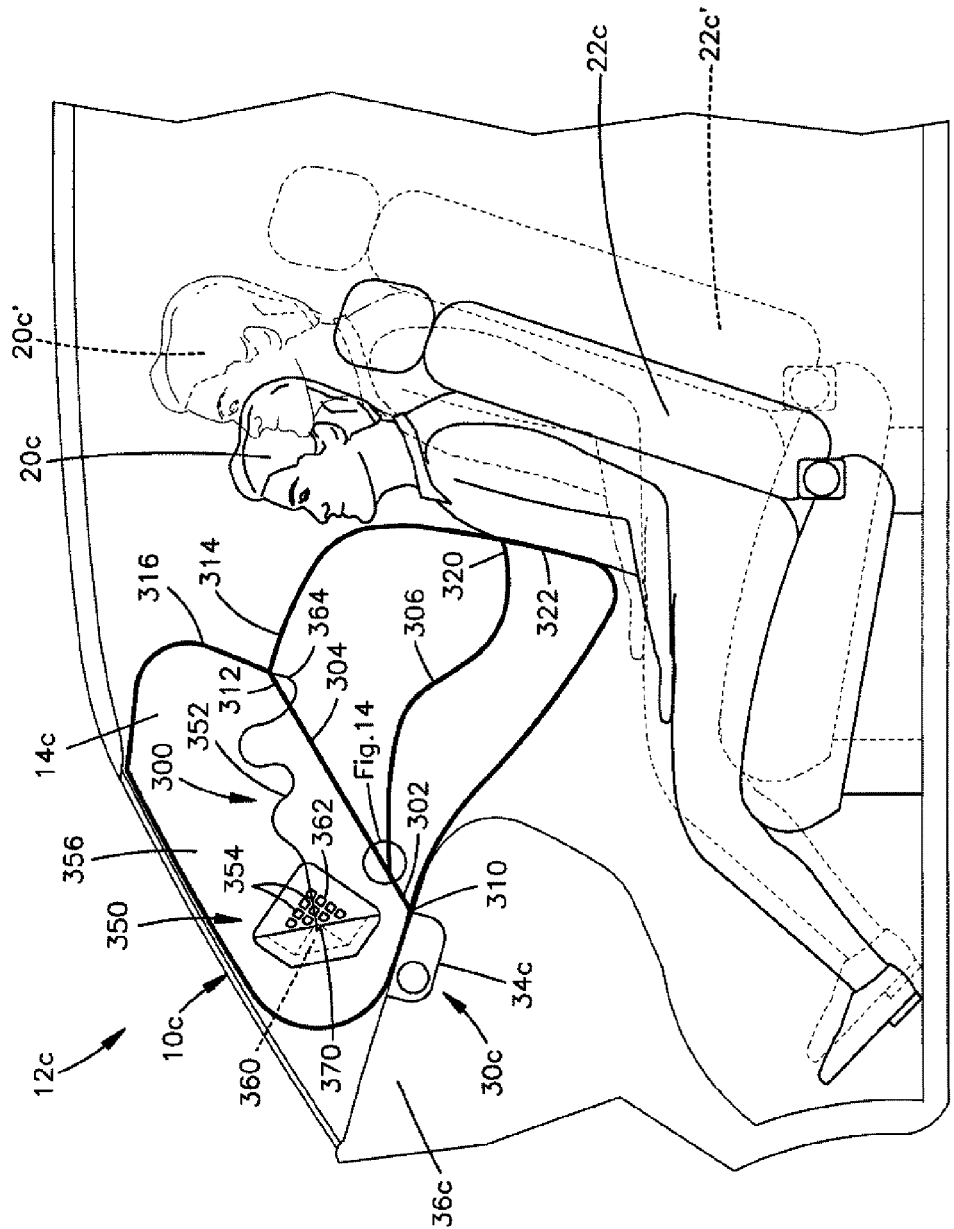

As shown in FIGS. 12 and 13, the air bag 14c also includes a vent 350 that is selectively actuatable to release inflation fluid from the inflatable volume of the air bag 14c. The adaptive tether 300 of the embodiments of FIGS. 12-15B includes a vent tether 352 that is operative to actuate the vent 300 in response to vehicle and occupant conditions at the time the air bag is deployed. The vent 300 thus may selectively release inflation fluid from the air bag 14c depending on these conditions.

The vent 350 may have various configurations. In the embodiment illustrated in FIGS. 12 and 13, the vent 350 includes one or more vent openings 354 formed in a panel 356, such as a side panel, of the air bag 14c. A vent door 360 is secured to the side panel 356. The adaptive tether 352 has a first end portion 362 secured to the vent door 360 and a second end portion 364 secured to a panel of the air bag 14c, such as the front panel 314.

The vent door 360 is secured to the panel 356 by known means (not shown), such as stitching, ultrasonic welding, heat bonding, or adhesives. The vent 350 has an open condition (FIG. 12) in which the vent door 360 is positioned away from the vent openings 354 and thereby permits inflation fluid to vent, i.e., flow, through the vent openings. In the open condition, the vent door 360 is folded away from the vent openings 354 and held in place by a releasable tear stitch 370.

When an event occurs which inflation of the air bag 14c is desired, the adaptive tether 300 respond to vehicle conditions, occupant conditions, or both to help control inflation and deployment of the air bag. According to the embodiment of FIGS. 13-15, this control is implemented passively through the physical construction or configuration of the air bag 14c and adaptive tether 300. For example, the air bag 14c may be constructed to respond to the size or position of the vehicle occupant 20c. This is illustrated in FIGS. 12 and 13.

Referring to FIG. 12, the occupant 20c is positioned relatively close to the instrument panel 36c and therefore relatively close to the air bag module 20c. This may be the case, for example, with a relatively small occupant, such as a child or small female occupant. For reference, a large occupant 20c' such as an average size or large adult male is illustrated in dashed lines. Those skilled in the art will appreciate that the smaller occupant 20c may adjust the vehicle seat 22c to a position forward of the seat 22c' of the larger occupant 20c'.

As shown in FIG. 12, in the case of a forward positioned occupant 20c, the mid/lower portion 322 of the front panel 314 of the air bag 14c engages the occupant during deployment. As shown, the forward positioned occupant 20c prevents the mid/lower portion 322 from deploying fully and thereby prevents the trigger tether 306 from becoming tensioned. As a result, the trigger tether 106 does not apply any significant tension or force on the tear stitching 332 sufficient to rupture the tear stitching 332 (see FIGS. 12 and 13).

On the other hand, also shown in FIG. 12, in the case of a forward positioned occupant 20c, the upper portion 316 of the front panel 314 of the air bag 14c does not engage the occupant during deployment. The forward positioned occupant 20c does not inhibit deployment of the upper portion 316 from deploying fully and, thus, the shaping tether 304 and anchor tether 302 become tensioned by the deploying front panel 314 of the air bag 14c. As a result, the tension in the shaping tether 304 and anchor tether 302 is applied to the tear stitching 332, which connects the two tethers.

Since, as described above, the tear stitching 332 has a relatively high shaping strength configured to withstand relatively high tension forces between the shaping tether 304 and the anchor tether 302, the tear stitching does not rupture in the event of the forward positioned occupant of FIG. 12. The shaping tether 304 helps maintain the shape of the air bag illustrated in FIG. 12. Those having skill in the art will appreciate that the shaping tether 304 helps maintain the upper portion 316 of the front panel 314 positioned away from the forward positioned occupant's head.

Also, in the case of a forward positioned occupant 20c, since the shaping tether 304 maintains the shape of the air bag as shown in FIG. 12, the vent tether 352 does not become tensioned and does not pull on the vent door 360. This is because the shaping tether 304 restricts full deployment of the upper portion 316 of the front panel 314 and thereby prevents the front panel from tensioning the vent tether 352. Thus, the vent 350 remains in the open condition. As a result, in the case of the forward positioned occupant 20c of FIG. 12, inflation fluid is permitted to vent from the inflatable volume of the air bag 14c.

Referring to FIG. 13, the occupant 20c is positioned away from the instrument panel 36c and therefore relatively far from to the air bag module 20c. This may be the case, for example, with a relatively large occupant, such as an adult male occupant. For reference, a small occupant 20c' such as a child or small female occupant in a forward seat position is illustrated in dashed lines. Those skilled in the art will appreciate that the larger occupant 20c may adjust the vehicle seat 32 to a position rearward of the seat 22c' of the smaller occupant 20c'.

As shown in FIG. 13, in the case of a rearward positioned occupant 20c, the occupant does not impede deployment of the mid/lower portion 322 of the front panel 314 of the air bag 14c. The mid/lower portion 322 is free to deploy to a fully deployed position. As a result, the trigger tether 306 becomes tensioned under the force of the deploying front panel 314 and the trigger tether 306 applies a significant tension or force on the tear stitching 332 (see FIGS. 12 and 13).

Since, as described above, the tear stitching 332 has a relatively low trigger strength configured to rupture under relatively low tension forces between the trigger tether 306 and the anchor tether 302, the tear stitching ruptures in the event of the rearward positioned occupant of FIG. 13. This releases the connection between the anchor tether 302 and the shaping tether 304. As a result, the shaping tether 304 does not maintain the shape of the air bag 14c and the air bag is permitted to inflate to the fully deployed position illustrated in FIG. 13.

Also, in the case of a rearward positioned occupant 20c, since the shaping tether is released and the air bag 14c is permitted to reach the fully inflated and deployed position, the vent tether 352 becomes tensioned in response to full deployment of the upper portion 316 of the front panel 214. When the air bag 14c reaches a threshold pressure, the tension on the vent tether 352 causes the tear stitching 370 to rupture, which releases the vent door 360 to move into the position illustrated in FIG. 13, covering the vent openings 354 and thereby preventing inflation fluid from venting from the inflatable volume. The air bag 14c thus reaches the fully deployed and pressurized condition illustrated in FIG. 13.

In view of the above, those skilled in the art will appreciate that, according to the present invention, the adaptive tether 300 acts to shape the air bag 14c and to vent inflation fluid from the air bag 14c in the event of a forward positioned occupant and blocks shaping of the air bag and venting of inflation fluid in the event of a rearward positioned occupant. Those skilled in the art will also appreciate that the adaptive function of the tether 300 is not limited to forward/rearward occupant position per se. For example, the adaptive tether 300 could function similarly to permit shaping and venting in the event of a child safety seat positioned on the vehicle seat 22c. Also, the adaptive tether 300 could function similarly to block shaping and venting in the event of an extremely large occupant, without regard to the forward/rearward position of the seat 22c. Further, the adaptive tether 300 could function similarly to permit shaping and venting in the event of an occupant positioned away from a normal seating position, such as a leaned-over or leaned-forward position, without regard to the forward/rearward position of the seat 22c and without regard to the occupant's size.

Figure 16:
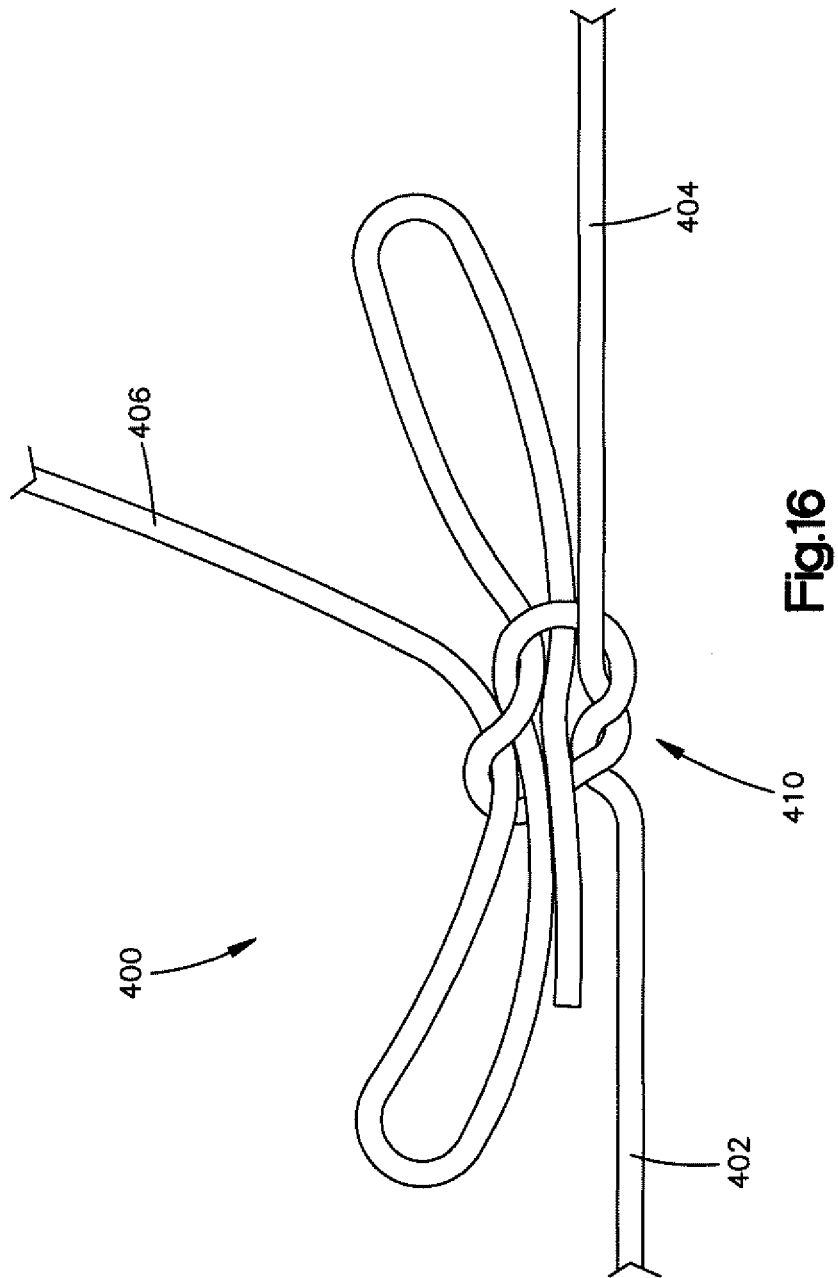
FIG. 16 illustrates an alternative configuration of a portion of the apparatus of FIGS. 2-15.

Those skilled in the art will appreciate that there may be alternatives to the tear stitching illustrated in the embodiments of FIGS. 2-15. One such alternative is illustrated in FIG. 16. Referring to FIG. 16, an adaptive tether 400 may include a knot 410 for making the connection between the trigger tether 406, anchor tether 402, and shaping tether 404. The knot 410 illustrated in FIG. 16 resembles a conventional bow knot used to tie shoelaces. Those skilled in the art will appreciate that other releasable knots may also be used to releasably secure the portions of the adaptive tether 400. As shown in FIG. 16, the knot 410 has a relatively high shaping strength and thus will withstand a great deal of tension between the shaping tether 404 and anchor tether 402 without releasing or rupturing. Those skilled in the art will appreciate that tension on the shaping tether 404 will tighten the knot 410. On the other hand, the knot 410 has a relatively low trigger strength and thus tension on the trigger tether 406 will act to release the knot 410 with relatively little tension. Those skilled in the art will appreciate that tension on the trigger tether 406 will serve to loosen and release the knot 410 and thus release the shaping tether 404. The apparatus of the first through fourth embodiments of FIGS. 2-15, fitted with the adaptive tether 400 of FIG. 16, may thus function in manners similar or identical to those described above in regard to those particular embodiments.

From the above description of the invention, those skilled in the art will perceive improvements, changes and modifications. Such improvements, changes and modifications within the skill of the art are intended to be covered by the appended claims.

Having described the invention, the following is claimed:

1. An apparatus for helping to protect an occupant of a vehicle, the apparatus comprising:
   an inflatable vehicle occupant protection device having a deflated condition and an inflated condition;
   an anchor tether secured to the vehicle;
   a shaping tether secured to a first portion of the protection device;
   a releasable connection that connects the anchor tether and shaping tether, the shaping tether secured to the vehicle via the connection with the anchor tether restricting deployment of the first portion of the protection device, the connection being configured to withstand tension between the anchor tether and shaping tether when the protection device is fully pressurized; and
   a trigger tether secured to a second portion of the protection device, the trigger tether being configured to release the connection between the anchor tether and shaping tether when tension in the trigger tether reaches a predetermined level to eliminate any tension between the anchor tether and the shaping tether, wherein the second portion of the protection device comprises a portion of the protection device that is blocked from reaching a fully deployed condition in the presence of an occupant being positioned within a predetermined distance of the deploying protection device and preventing the trigger tether from becoming tensioned to the degree necessary to release the connection.

2. The apparatus recited in claim 1, wherein the tension in the trigger tether reaches the predetermined level in response to deployment of the second portion of the protection device a predetermined distance.

3. The apparatus recited in claim 1, wherein the first portion of the protection device comprises an upper portion of the protection device, and the second portion of the air bag comprises a lower portion of the protection device, the shaping tether restricting the upper portion from reaching a fully deployed condition in response to the lower portion being inhibited from reaching a fully deployed condition and thereby preventing the trigger tether from becoming tensioned to the degree necessary to release the connection.

4. The apparatus recited in claim 1, wherein the shaping tether restricts the upper portion from reaching a fully deployed condition in response to the lower portion being blocked from reaching the fully deployed position.

5. The apparatus recited in claim 1, wherein the protection device comprises a frontal air bag inflatable away from an instrument panel of the vehicle to a position between the instrument panel and a front seat vehicle occupant, the first portion of the protection device comprising an upper portion of the air bag presented toward the head and upper torso of a normally seated occupant when deployed, and the second portion of the protection device comprising a lower portion of the air bag presented toward the lower torso of a normally seated occupant when deployed.

6. The apparatus recited in claim 5, wherein the shaping tether is configured and arranged to restrict deployment of the upper portion of the air bag in response to the lower portion of the air bag being blocked from reaching a fully deployed condition.

7. The apparatus recited in claim 5, wherein the shaping tether is configured and arranged to be released and permit unrestricted deployment of the upper portion of the air bag in response to the lower portion of the air bag reaching a fully deployed condition.

8. The apparatus recited in claim 1, further comprising:
   an actuatable vent for venting inflation fluid from the protection device; and
   a vent tether for actuating the vent, the vent tether being connected to the protection device and being operatively connected to the vent so as to actuate the vent in response to the protection device reaching a predetermined degree of deployment.

9. The apparatus recited in claim 8, wherein the vent tether is blocked from actuating the vent in response to the connection between the shaping tether and anchor tether being maintained, the vent tether actuating the vent in response to the trigger tether releasing the connection between the shaping tether and vent tether.

10. The apparatus recited in claim 9, wherein the vent tether is connected to the protection device at or near the location on the protection device where the shaping tether is connected to the protection device.

11. The apparatus recited in claim 8, wherein the vent tether extends through an aperture in the anchor tether.

12. The apparatus recited in claim 8, wherein the protection device comprises a frontal air bag inflatable away from an instrument panel of the vehicle to a position between the instrument panel and a front seat vehicle occupant, the first portion of the protection device comprising an upper portion of the air bag presented toward the head and upper torso of a normally seated occupant when deployed, and the second portion of the protection device comprising a lower portion of the air bag presented toward the lower torso of a normally seated occupant when deployed.

13. The apparatus recited in claim 12, wherein the shaping tether is configured and arranged to restrict deployment of the upper portion of the air bag in response to the lower portion of the air bag being blocked from reaching a fully deployed condition, and wherein the vent tether is configured and arranged to leave the vent in a non-actuated condition in response to the upper portion being restricted by the shaping tether.

14. The apparatus recited in claim 12, wherein the shaping tether is configured and arranged to be released and permit unrestricted deployment of the upper portion of the air bag in response to the lower portion of the air bag reaching a fully deployed condition, the vent tether being configured and arranged to actuate the vent in response to the unrestricted deployment of the upper portion.

15. The apparatus recited in claim 1, wherein the protection device comprises a frontal air bag inflatable away from an instrument panel of the vehicle to a position between the instrument panel and a front seat vehicle occupant.

16. The apparatus recited in claim 15, wherein the releasable connection comprises tear stitching,
the tear stitching, anchor tether, and shaping tether being constructed and arranged such that tension applied to the tear stitching by the shaping tether is distributed throughout the tear stitching, the tear stitching thereby withstanding the tension applied by the shaping tether,
the tear stitching, anchor tether, and trigger tether being constructed and arranged such that tension applied to the tear stitching by the trigger tether is focused on a portion of the tear stitching, the tear stitching rupturing in response to the tension applied by the trigger tether.

17. The apparatus recited in claim 16, wherein the tear stitching has a V-shaped configuration comprising leg portions that meet at a break point, the tear stitching, anchor tether, shaping tether, and trigger tether being constructed and arranged such that tension applied to the tear stitching by the shaping tether is distributed over the leg portions of the tear stitching, and such that tension applied to the trigger tether is focused on the break point of the tear stitching.

18. The apparatus recited in claim 1, wherein the releasable connection comprises tear stitching, the tear stitching, anchor tether, and trigger tether being constructed and arranged such that tension on the trigger tether applied by the second portion of the protection device results in peeling forces focused initially on a predetermined portion of the tear stitching, the tear stitching rupturing in response to the peeling forces.

19. The apparatus recited in claim 1, wherein the releasable connection comprises a knot that ties together the anchor tether, shaping tether, and trigger tether, the knot being configured such that tension on the shaping tether is transferred to the anchor tether and acts to tighten the knot, and such that tension on the trigger tether is transferred to the anchor tether and acts to loosen and untie the knot, the knot when untied releasing the shaping tether.

20. The apparatus recited in claim 1, wherein the shaping tether and trigger tether comprise portions of a single tether, the connection connecting the single tether to the anchor tether at the interface between the shaping tether and trigger tether portions of the single tether.

21. The apparatus recited in claim 1, wherein anchor tether is a component of an air bag module, the anchor tether being connected to the vehicle due to being connected to the air bag module.

22. An apparatus for helping to protect an occupant of a vehicle, the apparatus comprising:
an inflatable vehicle occupant protection device having a deflated condition and an inflated condition;
an anchor tether secured to the vehicle;
a shaping tether secured to a first portion of the protection device;
a releasable connection that connects the anchor tether and shaping tether, the shaping tether secured to the vehicle via the connection with the anchor tether restricting deployment of the first portion of the protection device, the connection being configured to withstand tension between the anchor tether and shaping tether when the protection device is fully pressurized; and
a trigger tether secured to a second portion of the protection device at a first end and to the anchor tether via the connection between the anchor tether and the shaping tether at a second end, the trigger tether being configured to release the connection between the anchor tether and shaping tether when tension in the trigger tether reaches a predetermined level such that the anchor tether is disconnected from the trigger tether.

23. An apparatus for helping to protect an occupant of a vehicle, the apparatus comprising:
an inflatable vehicle occupant protection device having a deflated condition and an inflated condition;
an anchor tether secured to the vehicle;
a shaping tether secured to a first portion of the protection device;
a releasable connection that connects the anchor tether and shaping tether, the shaping tether secured to the vehicle via the connection with the anchor tether restricting deployment of the first portion of the protection device, the connection being configured to withstand tension between the anchor tether and shaping tether when the protection device is fully pressurized; and
a trigger tether secured to a second portion of the protection device, the trigger tether being configured to maintain the connection between the anchor tether and shaping tether in response to inhibited deployment of the second portion, and to release the connection between the anchor tether and shaping tether in response to uninhibited deployment of the second portion.

* * * * *